United States Patent
Sur et al.

(10) Patent No.: US 12,465,241 B2
(45) Date of Patent: Nov. 11, 2025

(54) FACILITATING AT-HOME SPIROMETRY WITH MILLIMETER-WAVE DEVICES

(71) Applicant: UNIVERSITY OF SOUTH CAROLINA, Columbia, SC (US)

(72) Inventors: Sanjib Sur, Cayce, SC (US); Aakriti Adhikari, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 849 days.

(21) Appl. No.: 17/715,503

(22) Filed: Apr. 7, 2022

(65) Prior Publication Data

US 2022/0322964 A1 Oct. 13, 2022

Related U.S. Application Data

(60) Provisional application No. 63/176,514, filed on Apr. 19, 2021, provisional application No. 63/171,758, filed on Apr. 7, 2021.

(51) Int. Cl.
*A61B 5/087* (2006.01)
*A61B 5/00* (2006.01)
(Continued)

(52) U.S. Cl.
CPC ............ *A61B 5/087* (2013.01); *A61B 5/0507* (2013.01); *A61B 5/091* (2013.01); *A61B 5/7264* (2013.01);
(Continued)

(58) Field of Classification Search
CPC ....... A61B 5/087; A61B 5/0507; A61B 5/091; A61B 5/7264; G06N 3/049
See application file for complete search history.

(56) References Cited

U.S. PATENT DOCUMENTS

| 10,674,967 B2 * | 6/2020 | Rahman | ................ | A61B 7/003 |
| 2014/0194793 A1 * | 7/2014 | Nakata | .................... | G01S 13/87 |
| | | | | 601/48 |

(Continued)

OTHER PUBLICATIONS

CDC Government, Respiratory Health Spirometry Procedure Manual, National Health and Nutrition Examination Survey (NHANES), 2011, 77 Pages. https://www.cdc.gov/nchs/data/nhanes/nhanes_11_12/spirometry_procedures_manual.pdf.

(Continued)

*Primary Examiner* — Gary Collins
(74) *Attorney, Agent, or Firm* — DORITY & MANNING, P.A.

(57) ABSTRACT

An integrated system and associated methodology allow performing at-home spirometry tests using smart devices which leverage the built-in millimeter-wave (mmWave) technology. Implementations leverage deep learning with some embodiments including a combination of mmWave signal processing and CNN-LSTM (Convolutional Neural Network-Long Short-Term Memory Network) architecture. Smartphone devices are transformed into reliable at-home spirometers by having a user hold a device in front of their mouth, inhale their full lung volume, and forcibly exhale until the entire volume is expelled, as in typical spirometry tests. Airflow on the device surface creates tiny vibrations which directly affect the phase of the reflected mmWave signal from nearby objects. Stronger airflow yields larger vibration and higher phase change. The technology analyzes tiny vibrations created by airflow on the device surface and combines wireless signal processing with deep learning. The resulting low-cost, contactless method of lung function monitoring is not affected by noise and motion and provides all key spirometry indicators.

39 Claims, 8 Drawing Sheets

(51) Int. Cl.
A61B 5/0507 (2021.01)
A61B 5/091 (2006.01)
G06N 3/049 (2023.01)
(52) U.S. Cl.
CPC ...... *G06N 3/049* (2013.01); *A61B 2560/0252* (2013.01)

(56) References Cited

U.S. PATENT DOCUMENTS

2019/0239820 A1* 8/2019 Rahman ............... A61B 5/0537
2019/0336038 A1* 11/2019 Gorgutsa ............. A61B 5/0816

OTHER PUBLICATIONS

Easyone Air, EasyOne Air Portable & PC Spirometer, NDD Medical Technologies, 23 Pages. Retrieved Feb. 21, 2023 from website https://nddmed.com/products/spirometers/easyone-air#product-download-categories.
Goel et al., SpiroCall: Measuring Lung Function over a Phone Call, CHI '16 Proceedings of the 2016 CHI Conference on Human Factors in Computing Systems, May 2016, pp. 5675-5685. (Abstract Only) https://dl.acm.org/doi/10.1145/2858036.2858401.
Graham et al., Standardization of Spirometry 2019 Update. An Official American Thoracic Society and European Respiratory Society Technical Statement, American Journal of Respiratory and Critical Care Medicine, List of Issues, vol. 200, Issue 8, 2019. https://www.atsjournals.org/doi/full/10.1164/rccm.201908-1590ST.
Gundersen Health System, Respiratory & Lung Care Retrieved Feb. 21, 2023 from website: https://www.gundersenhealth.org/services/respiratory-lung-care.
Jones Medical, Flow-Volume Calibrator (FVC-3000). Retrieved Feb. 21, 2023 from website: https://www.jonesmedical.com/product/flow-volume-calibrator-fvc-3000/.
Khorram et al., End-to-End CNN+LSTM Deep Learning Approach for Bearing Fault Diagnosis, Applied Intelligence, vol. 51, 2020, pp. 736-751. https://arxiv.org/ftp/arxiv/papers/1909/1909.07801.pdf.
Larson et al., SpiroSmart: Using a Microphone to Measure Lung Function on a Mobile Phone, Proceedings of the 2012 ACM Conference on Ubiquitous Computing (UbiComp '12). ACM, New York, NY, 2012, pp. 280-289. https://ubicomplab.cs.washington.edu/pdfs/spirosmart.pdf http://dx.doi.org/10.1145/2370216.2370261.
Lecun et al., Convolutional Networks for Images, Speech, and Time-Series, Conference: The Handbook of Brain Theory and Neural Networks, 1995, 14 Pages. http://vann.lecun.com/exdb/publis/pdf/lecun-bengio-95a.pdf.
Microlife, PF100 Digital Peak Flow Meter. Retrieved Feb. 21, 2023 from Website: https://bit.ly/3sg2vjg https://www.microlife.com/consumer-products/respiratory-care/digital-peak-flow-meter/pf-100.
MIR, Spirometry, Oximetry and Mobile-Health. Retrieved Feb. 22, 2023 from website: https://usa.spirometry.com/.
Ranu et al., Pulmonary Function Tests, Ulster Medical Journal, vol. 80, No. 2, 2011, pp. 84-90. https://www.ncbi.nlm.nih.gov/pmc/articles/PMC3229853/pdf/umj8002-084.pdf https://pubmed.ncbi.nlm.nih.gov/22347750/.
Roblyer, Perspective on the Increasing Role of Optica Wearables and Remote Patient Monitoring in the COVID-19 Era and Beyond, Journal of Biomedical Optics, vol. 25, No. 10, 2020, 9 Pages. https://www.ncbi.nlm.nih.gov/pmc/articles/PMC7575829/pdf/JBO-025-102703.pdf.
Scalise et al., Wireless Sensing for the Respiratory Activity of Human Beings: Measurements and Wide-Band Numerical Analysis, International Journal of Antennas and Propagation, vol. 2013, Article ID 396459, 10 Pages. https://downloads.hindawi.com/journals/ijap/2013/396459.pdf.
Song et al., SpiroSonic: Monitoring Human Lung Function via Acoustic Sensing on Commodity Smartphones, MobiCom '20: Proceedings of the 26$^{th}$ Annual International Conference on Mobile Computing and Networking, Article 52, Apr. 2020, pp. 1-14. (Abstract Only) https://dl.acm.org/doi/10.1145/3372224.3419209.
Texas Instruments, IWR1443 Single-Chip 76-81 GHz mmWave Sensor Evaluation. Retrieved Feb. 21, 2023 from Website: https://www.ti.com/tool/IWR1443BOOST.
Xu et al., Empirical Evaluation of Rectified Activations in Convolutional Network, Machine Learning, 2015, 5 Pages. https://arxiv.org/pdf/1505.00853.pdf.
Xu et al., Joint Range and Angle Estimation Using MIMO Radar With Frequency Diverse Array, IEEE Transactions on Signal Processing, vol. 63, Issue 13, Jul. 2015, pp. 3396-3410. (Abstract Only) https://ieeexplore.ieee.org/document/7084678.
Zhang et al., A Combination of RNN and CNN for Attention-Based Relation Classification, Procedia Computer Science, vol. 131, 2018, pp. 911-917.

* cited by examiner

| | 1DC1 | 1DC2 | 1DC3 | 1DC4 | 1DC5 | LSTM1 | LSTM2 | FC1 | FC2 |
|---|---|---|---|---|---|---|---|---|---|
| Filter Number | 1024 | 256 | 128 | 64 | 32 | 128 | 128 | 50 | 7 |
| Filter Size | 2 | 2 | 2 | 2 | 2 | | | | |
| Maxpooling | 2 | 4 | 4 | 2 | 2 | | | | |
| Activation Function | LReLU | LReLU | LReLU | LReLU | LReLU | Tanh | Tanh | ReLU | Linear |

CNN-LSTM network parameters. 1DC: 1D Convolution; FC: Fully Connected; LReLU: LeakyReLU.

FACILITATING AT-HOME SPIROMETRY WITH MILLIMETER-WAVE DEVICES

PRIORITY CLAIM

The present application claims the benefit of priority of U.S. Provisional Patent Application No. 63/171,758, titled Facilitating At-Home Spirometry with Millimeter-Wave Devices, filed Apr. 7, 2021, and of U.S. Provisional Patent Application No. 63/176,514, titled Facilitating At-Home Spirometry with Millimeter-Wave Devices, filed Apr. 19, 2021, both of which are fully incorporated herein by reference for all purposes.

BACKGROUND OF THE PRESENTLY DISCLOSED SUBJECT MATTER

Presently disclosed subject matter relates generally to the importance of at-home spirometry, and more particularly, to facilitating at-home spirometry with millimeter-wave devices.

The rapid evolution of the telehealth industry, accelerated over the past year by stay-at-home directives worldwide, has created a demand for more ubiquitous health-sensing tools [1]. One such tool is the spirometer, which provides objective measures of lung function and has wide applicability in diagnosing asthma, COPD, cystic fibrosis, and other pulmonary diseases[2]. It can be used to diagnose dyspnea, i.e., shortness of breath, one of the symptoms of COVID-19. Due to the steady rise of COVID-19 cases and its long-haul syndromes[3], a broader set of people will now require continuous lung function monitoring. At-home spirometry tests allow one to continuously monitor for recovery, detect changes, and gather long-term lung function evolution. Several spirometers are available for home-use, but they are either costly or provide limited information and require extra hardware[4-6]. Recent works have developed contactless lung function monitoring systems, but are also either expensive or require extra hardware[5; 17]. Researchers have sought to propose low-cost means to measure lung functionalities using audio signals[18-20]. However, such systems are not only highly susceptible to noise and motion but also provide limited spirometry indicators.

SUMMARY OF THE PRESENTLY DISCLOSED SUBJECT MATTER

Aspects and advantages of the presently disclosed subject matter will be set forth in part in the following description, may be apparent from the description, or may be learned through practice of the presently disclosed subject matter.

Broadly speaking, the presently disclosed subject matter relates to an integrated system for performing at-home spirometry tests.

Another presently disclosed broader object is to provide low-barrier approaches to performing at-home spirometry tests by using 5G smart devices.

Yet another aspect of the presently disclosed subject matter is to improve mmFlow technology areas related as presently disclosed herewith to performing at-home spirometry tests using 5G smart devices by leveraging the built-in millimeter-wave (mmWave) technology on ubiquitous mobile devices and to provide a software-only spirometry solution.

Per presently disclosed subject matter, mmFlow is utilized as a contactless method of lung function monitoring that enables a low-cost solution that is not affected by noise and motion and provides all key spirometry indicators. The presently disclosed implementations of mmFlow technology leverages recent advancements in deep learning and, for some embodiments, may propose a combination of mmWave signal processing and CNN-LSTM (Convolutional Neural Network-Long-Short Term Memory Network) term to facilitate at-home spirometry. Thus, presently disclosed subject matter provides an mmFlow-based system that enables at-home spirometry with cheap and ubiquitous mobile mmWave devices without requiring any extra hardware. Therefore, the presently disclosed mmFlow-based technology can be a key solution that can transform 5G smartphones into reliable at-home spirometers in the post-COVID era.

An integrated system and associated methodology allow performing at-home spirometry tests. At-home spirometry tests are performed using 5G smart devices by leveraging the built-in mmWave technology in conjunction with a software-only spirometry solution. The resulting low-cost, contactless method of lung function monitoring is not affected by noise and motion, and it provides all key spirometry indicators. Implementations of mmFlow technology leverages deep learning with some embodiments including a combination of mmWave signal processing and CNN-LSTM. Smartphone devices are transformed into reliable at-home spirometers by having a user hold a device in front of their mouth, inhale their full lung volume, and forcibly exhale until the entire volume is expelled, as in typical spirometry tests. Airflow on the device surface creates tiny vibrations which directly affect the phase of the reflected mmWave signal from nearby objects. For example, stronger airflow yields larger vibration and higher phase change. The mmFlow technology analyzes the tiny vibrations created by the airflow on the device surface and combines wireless signal processing with deep learning to facilitate at-home spirometry with readily available mobile mmWave devices.

Some embodiments of presently disclosed subject matter relate to mmFlow-based technologies which would have a user hold a device in front of their mouth, inhale their full lung volume, and forcibly exhale until the entire volume is expelled, as in typical spirometry tests[7]. The presently disclosed device could then output known key spirometry indicators (such as seven indicators per reference[8]).

One presently disclosed exemplary methodology preferably relates to an integrated methodology for performing at-home spirometry tests using smart devices having built-in mmWave technology. Such methodology preferably may comprise providing a smart device programmed with a mmFlow analysis application; having a user hold such device in front of their mouth, inhale their full lung volume, and forcibly exhale until the entire volume is expelled to obtain a sample exhalation; detecting vibrations of a surface of the device caused by the sample exhalation; and processing the vibration data to determine at least one spirometry indicator for the user.

It is to be understood from the complete disclosure herewith that the presently disclosed subject matter equally relates to both methodology and corresponding and related apparatus.

One presently disclosed exemplary embodiment relates to a smart device having built-in mmWave technology, and programmed with a mmFlow analysis application, all operating in accordance with the foregoing exemplary integrated methodology.

Another exemplary method relates to a contactless method of lung function monitoring for a user, with such monitoring not affected by noise and motion, while providing all key spirometry indicators for the user. Such an exemplary method may preferably comprise continuously transmitting a wireless signal towards a reflector and receiving its reflections using a 5G smart device having built-in mmWave technology, and having a supporting software-only spirometry application on such smart device; having a user produce a sample exhalation while holding the smart device in a relatively static position; using the spirometry application for detecting time-variant changes in the distance of the device to the reflector based on vibrations caused by airflow of the sample exhalation from the user; determining changes in phase based on detected changes in distance based on: $\Delta\phi(t)=\{4\pi\Delta d(t)\}/\lambda$, where $\Delta d(t)$ is the temporal change in distance, and $\lambda$ is the signal wavelength; determining distinct vibration signature images due to airflow; and correlating such vibration signature images with spirometry indicators.

Another presently disclosed exemplary embodiment relates to a smart device having built-in mmWave technology and having a supporting software-only spirometry application on such smart device, all operating in accordance with the foregoing exemplary method relating to a contactless method of lung function monitoring for a user.

Other example aspects of the present disclosure are directed to systems, apparatus, tangible, non-transitory computer-readable media, user interfaces, memory devices, and electronic smart devices or the like. To implement methodology and technology herewith, one or more processors may be provided, programmed to perform the steps and functions as called for by the presently disclosed subject matter, as will be understood by those of ordinary skill in the art.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to the use of mmFlow technology as a low-barrier approach to performing at-home spirometry tests. Such tests may be performed using, for example, 5G smart devices, with mmFlow technology leveraging the built-in mmWave technology on such mobile devices. The present disclosure further refers to a supporting software-only spirometry solution on such smart device.

In some presently disclosed embodiments, mmFlow would involve the user holding the mobile device in front of their mouth, inhaling their full lung volume, and forcibly exhaling until the entire volume is expelled, as in typical spirometry tests[7]. It could then output key spirometry indicators.

Figure 1A:
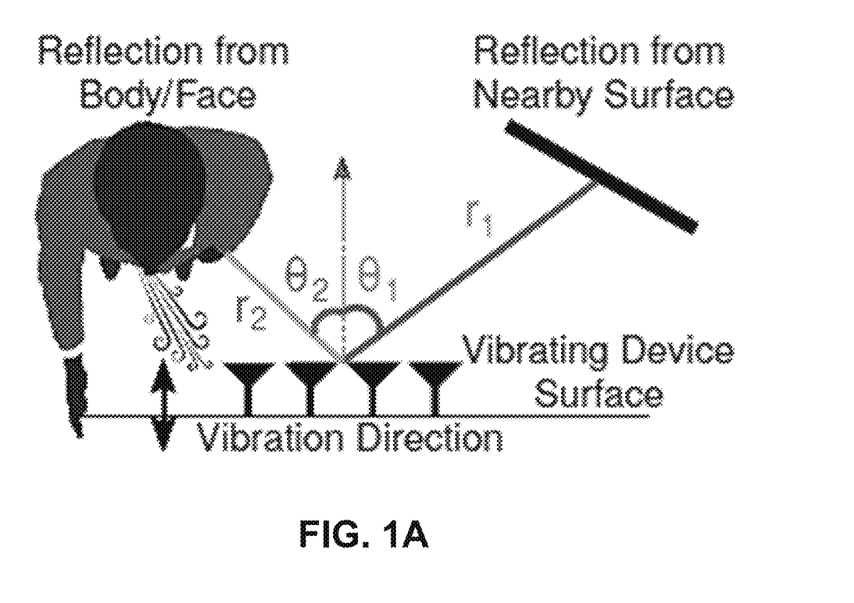
FIG. 1A represents the surface of an exemplary mmWave device (such as a smartphone) receiving reflections from different objects, with airflow affecting the reflected signals.
Figure 1B:
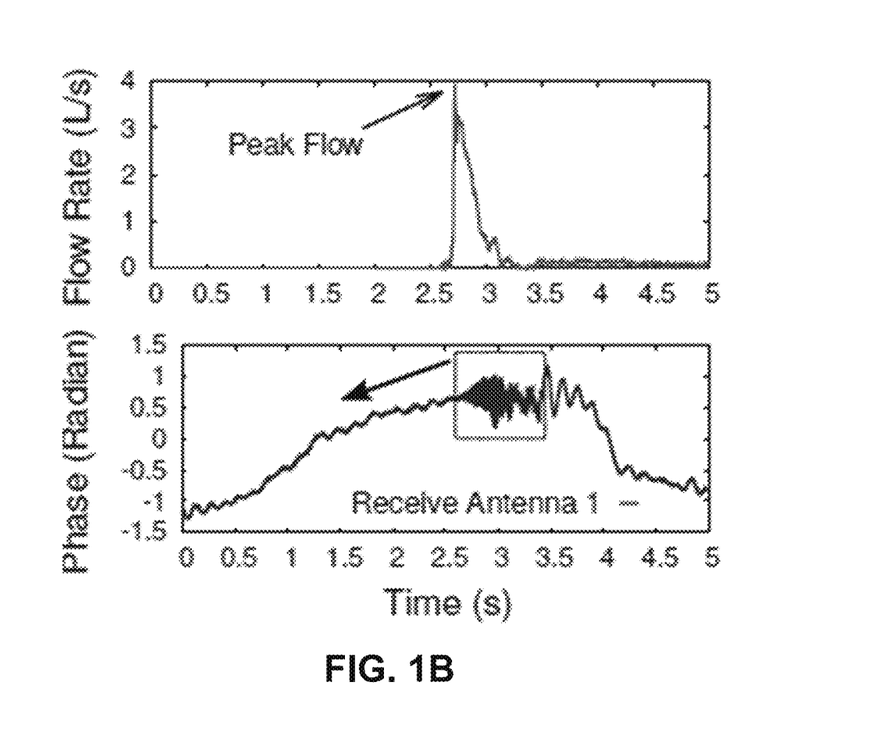
FIG. 1B graphically illustrates a flow rate over time (upper graph) of an example exhalation with a peak rate of 3.96 L/s and with the bottom graph showing corresponding phase of the reflected signal.
Figure 1C:
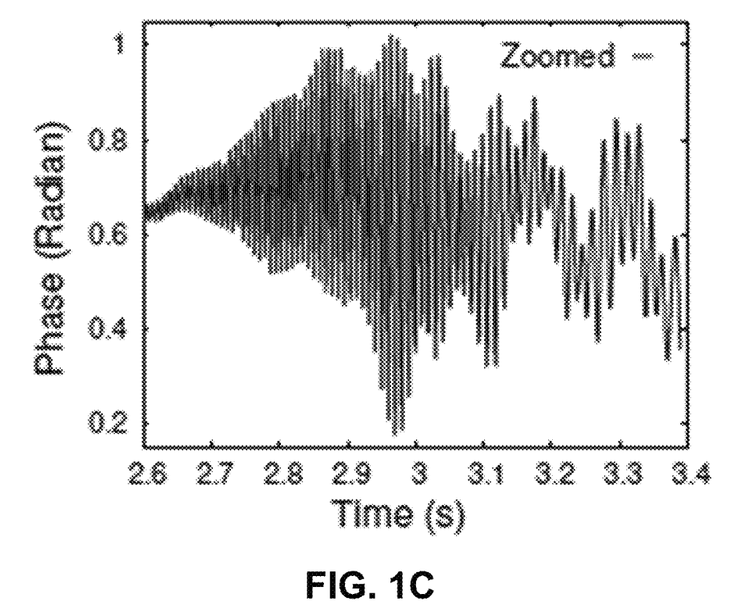
FIG. 1C illustrates a zoomed-in (enlarged) portion of the phase graph (rectangle-boxed) portion of FIG. 1B.
Figure 1D:
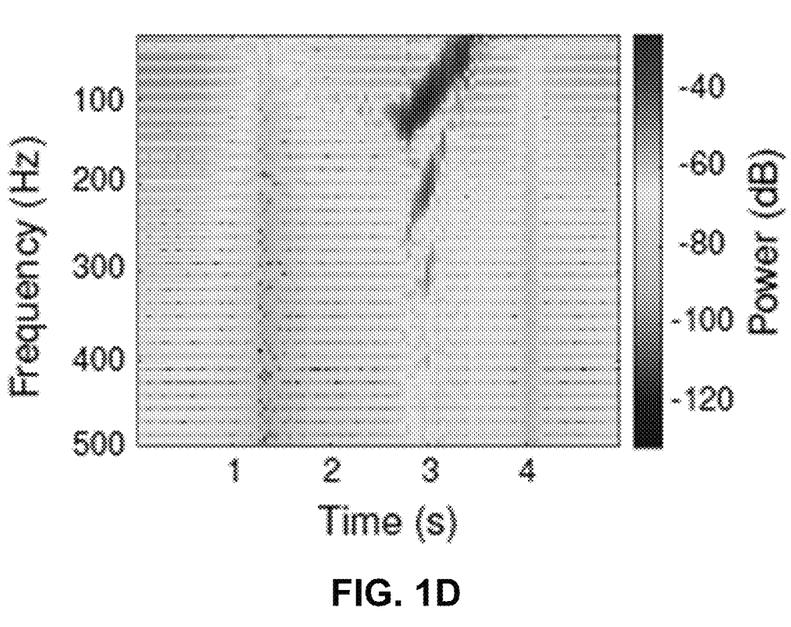
FIG. 1D illustrates a spectrogram (time-frequency) plot showing exemplary distinct vibration signature images due to the representative airflow.

More specifically, FIG. 1A represents the surface of an exemplary mmWave device (such as a smartphone) receiving reflections from different objects, with airflow affecting the reflected signals. FIG. 1B graphically illustrates a flow rate over time (upper graph) of an example exhalation with a peak rate of 3.96 L/s and with the bottom graph showing corresponding phase of the reflected signal. FIG. 1C illustrates a zoomed-in (enlarged) portion of the phase graph (rectangle-boxed) portion of FIG. 1B. FIG. 1D illustrates a spectrogram (time-frequency) plot showing exemplary distinct vibration signature images due to the representative airflow.

Exemplary measurements and observations are discussed as follows. Strong airflow on the device surface creates tiny vibrations. Such vibrations directly affect the phase of the reflected mmWave signal from nearby objects. For example, a 79 GHz device (i.e., signal wavelength: 3.79 mm) will register a 50 μm vibration displacement as a 9.5° phase change. Stronger airflow yields larger vibration and higher phase change. The presently referenced mmFlow-based technology analyzes the tiny vibrations created by the airflow on the device surface and combines wireless signal processing with deep learning to facilitate at-home spirometry with cheap and ubiquitous mobile mmWave devices.

Assume, for example, that a hand-held mmWave device is continuously transmitting a wireless signal towards a reflector and receiving its reflections (such as represented by present FIG. 1A). When the user holds the device in a static position, the phase of the reflected signal remains static. However, when airflow strikes the device's surface, the device starts to vibrate, causing a time-variant change in the distance of the device to the reflector. This change in distance results in a change in phase: $\Delta\phi p(t)=\{4\pi\Delta d(t)\}/\lambda$, where $\Delta d(t)$ is the temporal change in distance, and $\lambda$ is the signal wavelength. As noted above, FIGS. 1B and 1C show an example of such phase change due to exhalation with 3.96 L/s peak flow rate: one may observe a distinct vibratory signature on the reflected signal. FIG. 1D further analyzes the phase change by plotting the spectrogram, which identifies not only the vibration start and stop time, but also the temporal distribution of the vibration amplitude and frequency.

Thus, if we can analyze the vibration signal, we would be able to identify the correlated airflow rate, exhalation volume, and predict the lung function accurately. However, mmFlow-based technology faces two key challenges in bringing such an idea into practice.

First, to accurately correlate the airflow with the vibration, the phase change should only be derived from the airflow and only be tracked from a nearby static object. In the absence of a static object, we could leverage the user's body as the reflector, but sway motion of the hand or body will introduce spurious phase change, corrupting the airflow-only information. So, the challenge here is to track the phase change under sway motion.

Second, the relationship between the vibration signal and the spirometry indicators has never been explored before. Intuitively, peak vibration amplitude and frequency could determine the peak airflow rate; however, a mathematical model for mapping the vibration signal to all spirometry indicators would be complex and would require hand-tuning several parameters in practice. So, aiming for such a mathematical model may not only be intractable but also may also yield inaccurate results.

To overcome such challenges, the presently referenced mmFlow technology proposes two core design techniques: (1) Beamforming and reflector tracking which provide accurate vibration estimation. The high-level idea is to use multiple receive antennas in locating and tracking a strong reflector for estimating device's self-vibration. (2) A machine-learning model that uses the vibration signal to predict the spirometry results. The high-level idea is to use a deep convolution network that learns (from previous hundreds of examples) the hidden association between the vibration signal and airflow information. The network can then predict the key spirometry indicators, similar to those found in clinical or high-end home spirometers.

The first core design technique relates to beamforming and reflector tracking. Tracking the phase change from a moving reference yields incorrect estimation of vibration and a wrong spirometry result. To overcome such challenge, mmFlow leverages the opportunity that mmWave devices comprised of multiple receive antennas (4 in mmFlow) that can measure reflections simultaneously. Due to the antenna separation, the measured signals could be used to localize a reflector in space. Under the device's sway motion, the signals could be steered continuously towards the same reflector to estimate the vibration characteristics accurately.

To ensure that mmFlow could steer the signal towards an optimal location, the signals from all 4 receive antennas are combined using the following range-angle (r-θ) equation[9]:

$$BF(r, \theta) = \sum_{n=1}^{4} v_n(r) \times \exp\left[\frac{-j2\pi}{\lambda}(n-1)d\cos(\theta)\right] \quad (1)$$

where $v_n(r)$ is the reflected signal received at $n^{th}$ antenna from range r, $\lambda$ is the signal wavelength, and d is the inter-distance between the antennas ($d=\lambda/2$, in mmFlow).

Figure 2A:
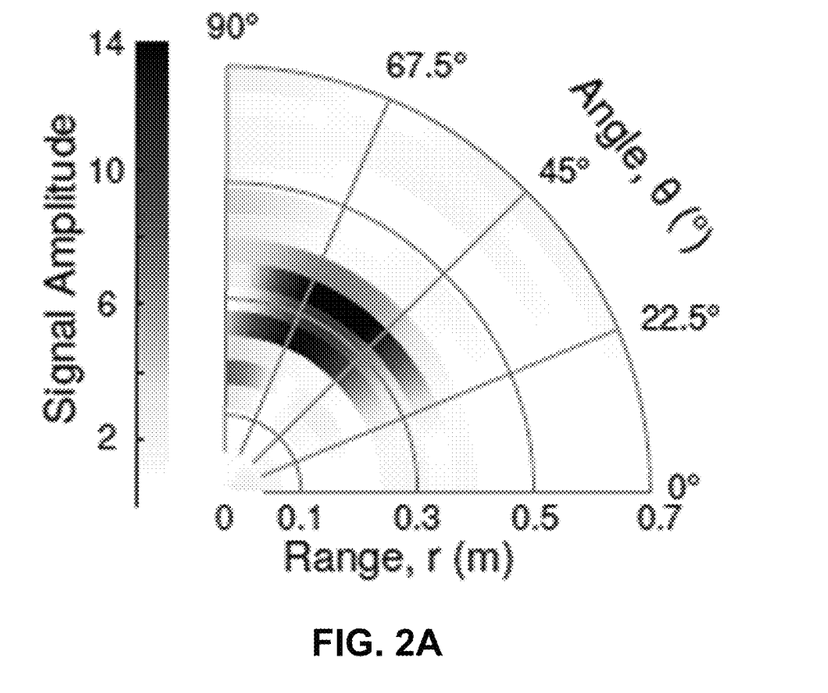
FIG. 2A shows an example of a range-angle heatmap estimated by the subject mmFlow in an environment with two reflectors, one at 35 cm and 55°, and another at 25 cm and 60° from the device.

FIG. 2A shows an example of a range-angle heatmap estimated by mmFlow in an environment with two reflectors, one at 35 cm and 55°, and another at 25 cm and 60° from the device. To estimate the phase change from a single strongest reflector throughout the spirometry test, mmFlow uses a reflector tracking scheme leveraging the range-angle estimation.

First, when the user places the device in front of their mouth, and before they start blowing the air, mmFlow uses the measured reflected signals from multiple receive antennas and computationally scans the nearby region to find the strongest reflector. Said differently, it finds the r and θ from Equation (1) where $|BF(r, \theta)|$ is maximum:

$$\{r^*, \theta^*\} = \operatorname{argmax}\{|BF(r,\theta)|\} \quad (2)$$

Then, every time it receives new reflected signals, mmFlow re-applies Equation (1) to estimate a new range-angle heatmap. When air is blown at the device, the reflector's relative location (w.r.t.) may shift and the earlier strongest reflector may no longer remain the strongest. Still, to track the phase change from the earlier reflector, mmFlow finds few sets of $(r_i, \theta_i)$ by sorting the new $|BF(r_i, \theta_i)|$ in descending order and choosing the $(r_i, \theta_i)$ based on the shortest Euclidean distance from the earlier reflector's range-angle, $(r^*, \theta^*)$. This ensures mmFlow could track the phase from a single reflector:

$$\{r_i^*, \theta_i^*\} = \underset{i}{\mathrm{argmin}}\left\{\sqrt{(r^* - r_i)^2 + (\theta^* - \theta_i)^2}\right\} \tag{3}$$

Figure 2B:
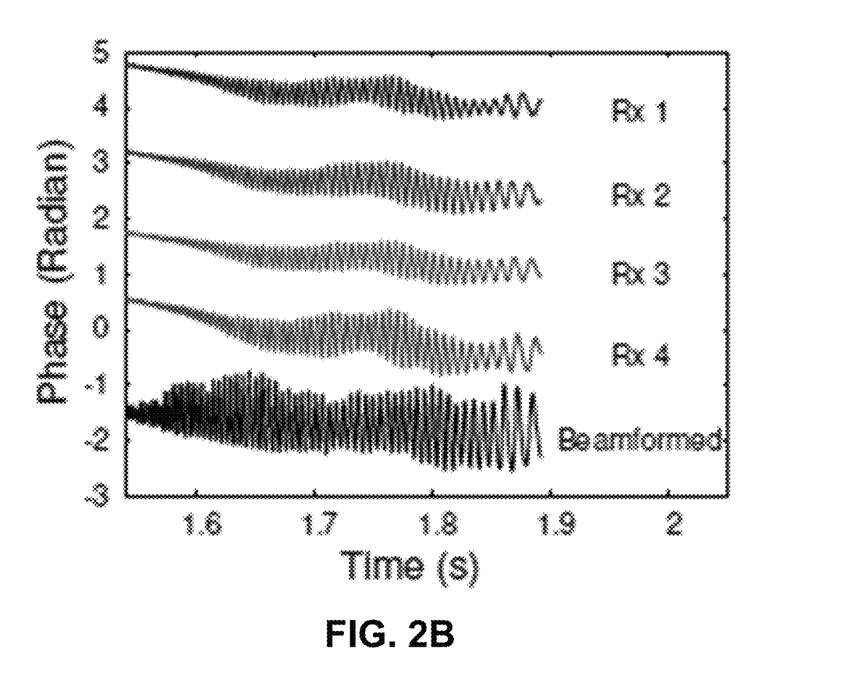
FIG. 2B shows an example of vibration signals estimated as detected by the 4 (four) individual receive antennas and the beamformed signal towards the strongest reflector.
Figure 3A:
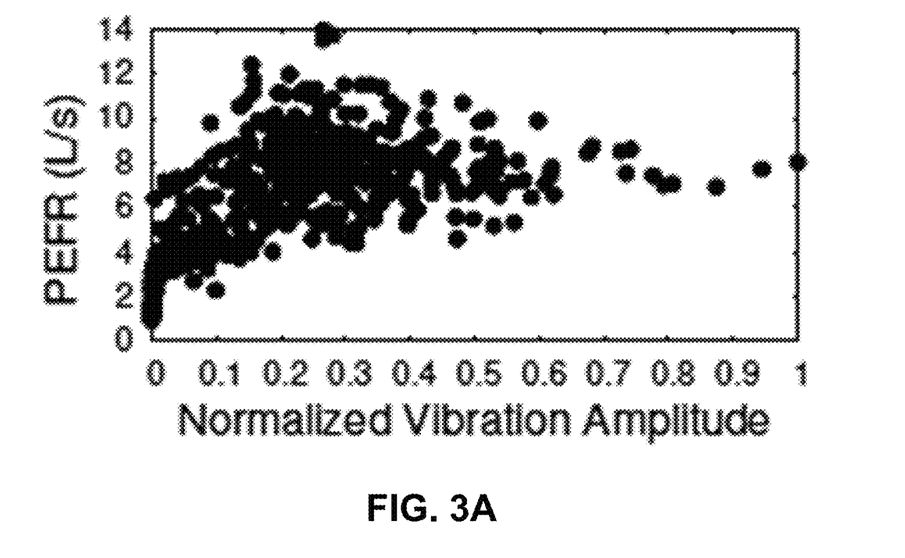
FIGS. 3A-3D are respective graphs which variously show exemplary relationships between different spirometry indicators and vibration amplitudes, as part of mapping correlations between vibration and spirometry indicators.
Figure 3B:
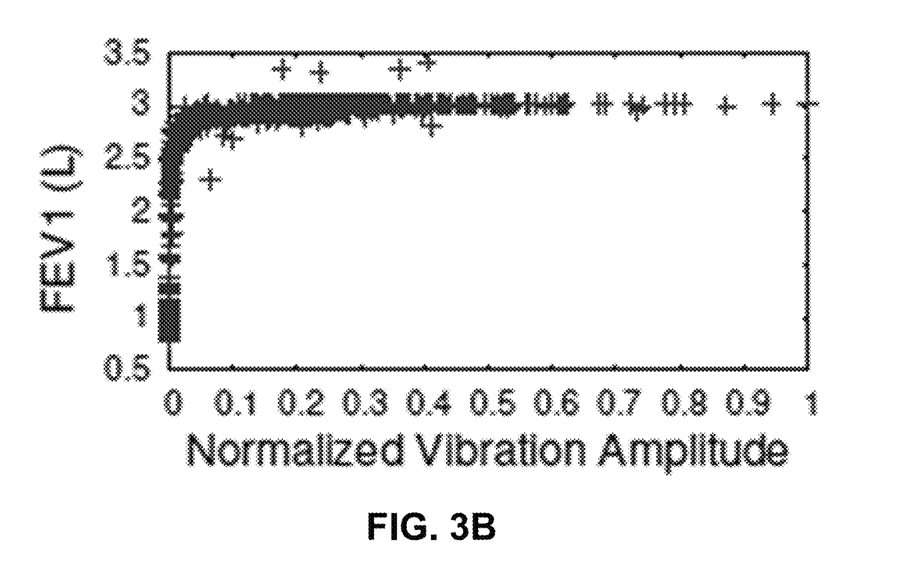
Figure 3C:
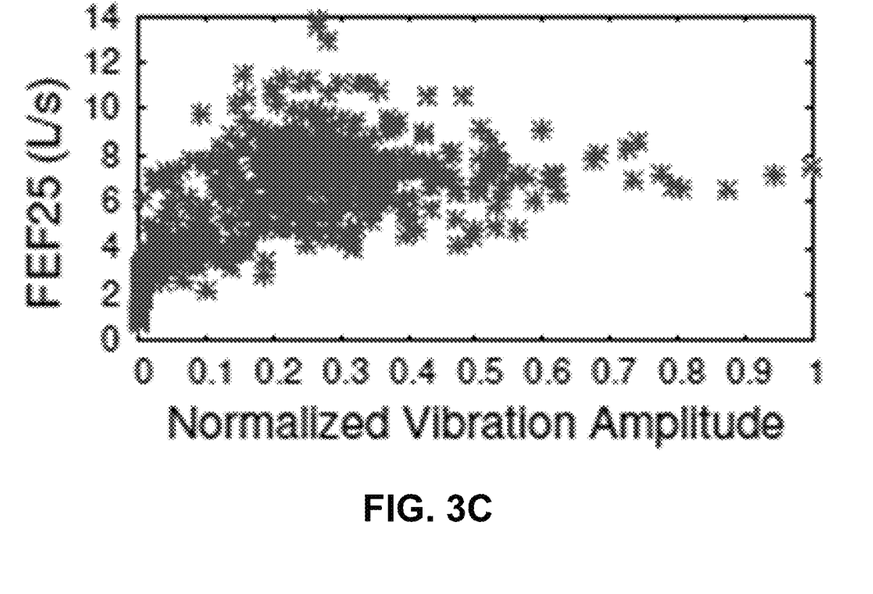
Figure 3D:
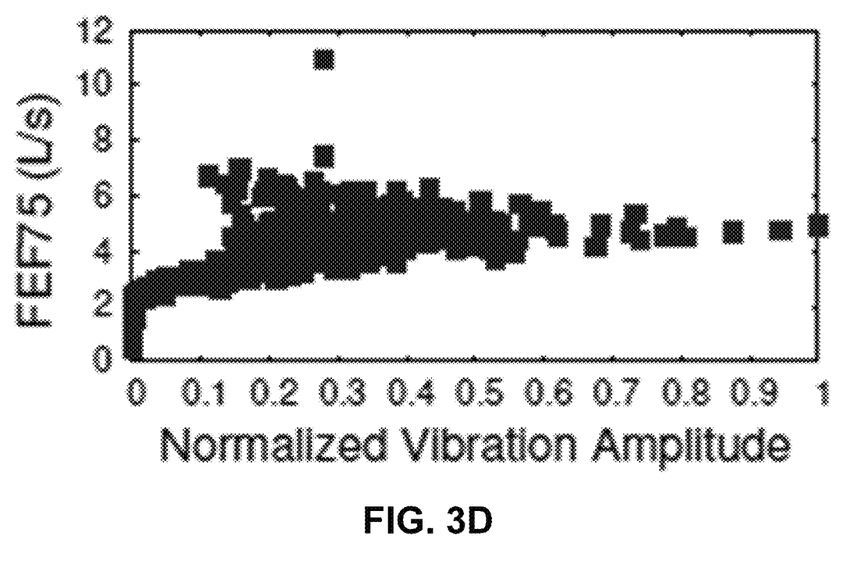

Finally, mmFlow uses the new estimation, $(r^*_i, \theta^*_i)$, and applies the receive beamforming[9] at the correct range and angle. FIG. 2A shows a range-angle heatmap showing two strong reflectors, as referenced above. FIG. 2B shows an example of vibration signals estimated as detected by the 4 individual receive antennas and the beamformed signal towards the strongest reflector.

Clearly, the beamformed signal improves the quality of vibration signature since beamforming also increases the signal-to-noise ratio. Besides, mmFlow applies a high-pass filter to remove the residual low-frequency sway movement of the hand. These ensure an accurate estimation of the vibration signal, even under the user's sway movement or relative location change of the reflector during the spirometry tests.

FIGS. 3A-3D variously show exemplary relationships between different spirometry indicators and vibration amplitudes, as part of mapping correlations between vibration and spirometry indicators. To map the estimated vibration to the spirometry indicators, mmFlow first explores the correlation between them. Intuitively, stronger airflow (i.e., higher values of indicators) yields larger vibrations. To verify this intuition, we use the mmWave device[10] and the flow-volume calibrator that mimics human exhalation[11]. We place the device at an 11 cm distance from the calibrator nozzle on a static table and use the wall behind the setup as our reflector. We perform 589 spirometry tests emulating exhalation from healthy individuals and different pulmonary disease patients. Thus, our experiments span a wide range of lung functions: PEFR (0.93-13.9 L/s), FEV1 (0.77-3.41 L), etc. For each test, we estimate the vibration signal and record the spirometry indicators.

FIGS. 3A-3D are respective graphs of results which show the relationship between four of the spirometry indicators with the normalized vibration amplitude. While we observe that there is a trend in the relationship between volume and rate of airflow and vibration signal, it is hard to capture this relationship using straightforward models. We can also infer that the spirometry indicators are not linearly correlated with the vibration signal. Thus, mmFlow aims to learn the correlation using a non-linear model.

The second core design technique relates to learning correlation using CNN-LSTM, which is an LSTM architecture specifically designed for sequence prediction problems with spatial inputs, like images. Instead of a parametric nonlinear regression model, which may need handcrafted tuning of several parameters, mmFlow captures the correlation using a data-driven approach. The high-level idea is intuitive: mmFlow trains a CNN-LSTM framework by showing hundreds of examples of the mmWave vibration signal and the corresponding ground-truth spirometry indicators. The framework uses CNN to extract the short-term features and LSTM to identify the long-term evolution of vibration so that the network could learn the association between the time-domain vibration signal and the indicators.

Figure 4A:
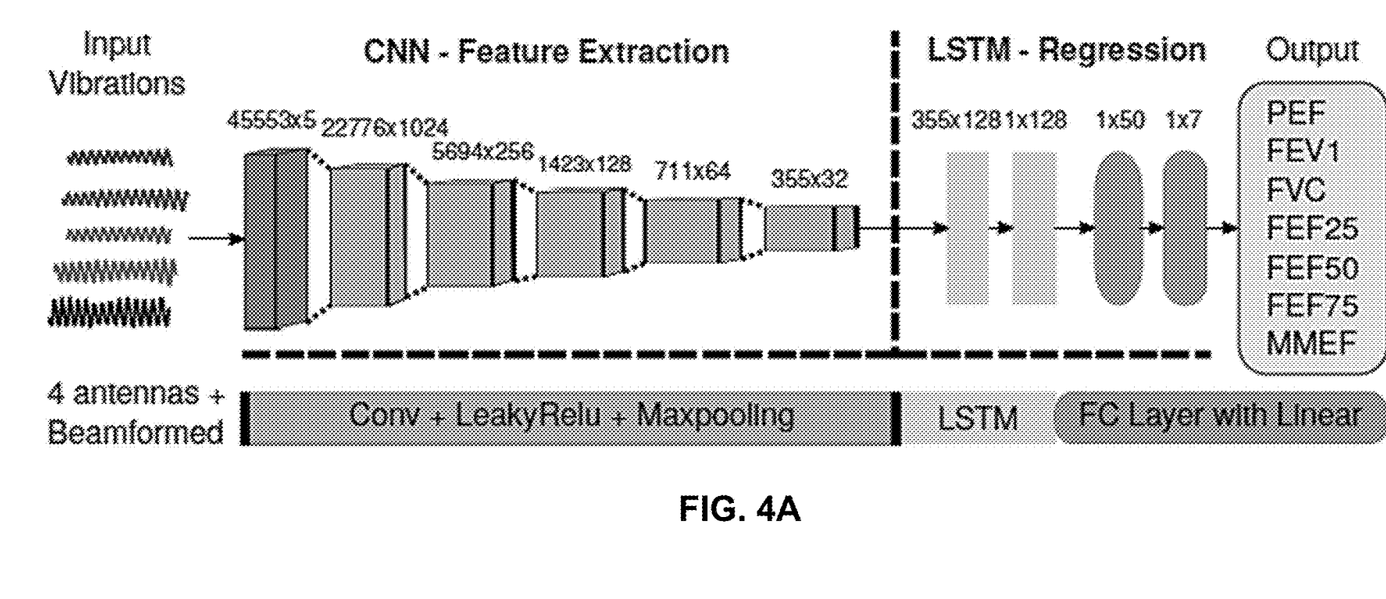
FIG. 4A is a diagram of the CNN-LSTM architecture of the exemplary mmFlow system.

FIG. 4A is a diagram of the CNN-LSTM network architecture of the mmFlow system. The mmFlow system uses one-dimensional (1D) CNN as a feature extractor and LSTM with dense layers as a long-term regressor. The CNN-LSTM network takes the vibration signal estimated from the 4 receive antennas and the beamformed signal and predicts the seven spirometry indicators.

In the mmFlow system, CNN serves as the feature extractor. The core purpose of the CNN is to learn relevant features that can map input vibration with output indicators through series of convolutions. To this end, mmFlow's CNN passes the 1D vibration signal from each receive antenna and beamformed signal through five 1D convolution layers, which subsequently apply convolutional filters with a set of weights that slides over the input. Filters are receptive fields, and with a smaller filter size, each convolution layer compresses the vibration signal towards its abstract local features[12]. The CNN of mmFlow also employs max pooling [13] that helps not only to reduce the spatial size of convolved features but also to suppress noisy activations and extract the dominant features that are position invariant in the vibration. Each convolution layer employs a Leaky ReLU (LReLU) activation to help tune the network weights better[14]. At the end of the CNN layers, mmFlow is able to extract the local feature maps in the input vibration signal. These features are broken down into sequential components and are fed into recurring LSTM units for temporal analysis and indicators' prediction.

Figure 4B:
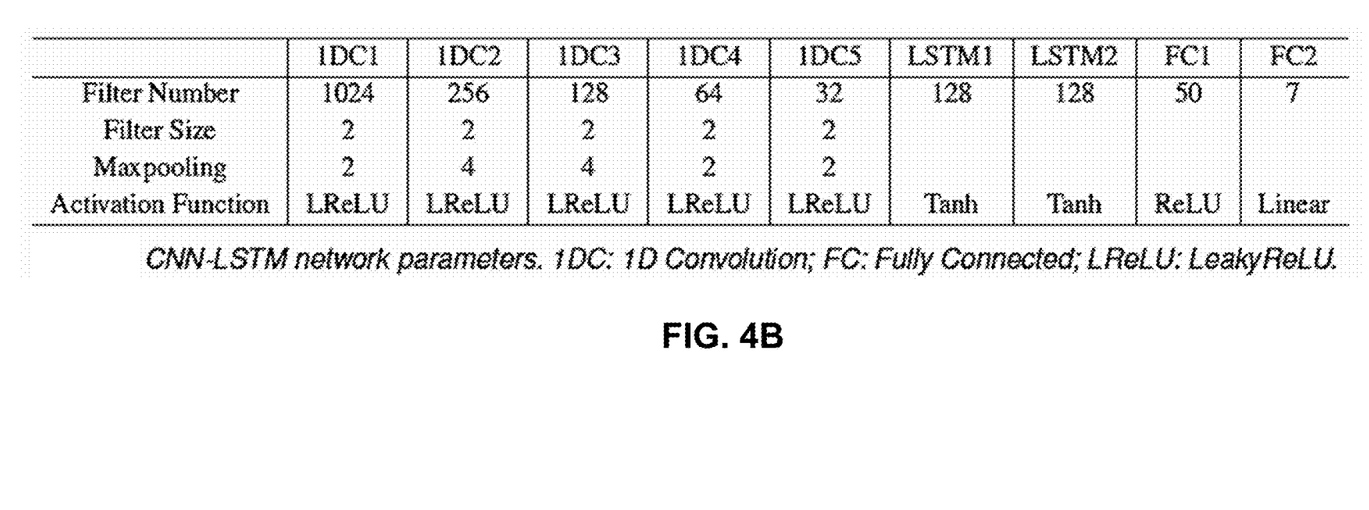
FIG. 4B summarizes the CNN-LSTM network parameters of the exemplary mmFlow system.

In the mmFlow system, LSTM serves as the regressor. The core purpose of the LSTM is to capture long-term temporal dependencies between local features through recurrent connections between units. LSTM employs forget gates to selectively forget or remember input features. By backpropagating and adapting the weights through the gates, the LSTM module can retain higher importance temporal features and discard the irrelevant ones[15]. To be compatible with the CNN feature size and to train the network better, mmFlow uses 2 LSTM layers with unit sizes equal to four times the CNN's output size. Each LSTM layer employs Tanh activation and is fully connected with the adjacent layers. Finally, the output neurons go through a regression layer with a linear activation to predict the actual values of the indicators. FIG. 4B summarizes the CNN-LSTM network parameters of the exemplary mmFlow system, including 1DC: 1D Convolution; FC: Fully Connected; LReLU: Leaky ReLU.

The network loss function is described as follows. CNN-LSTM relies on a loss function to appropriately tune the convolution weights. We use Mean Squared Error (MSE) as the loss function that calculates the average squared difference between the predicted and ground-truth indicators, and it accelerates the learning by penalizing weights causing larger errors.

$$MSE = \frac{1}{N}\sum_{i=1}^{N}(Y_i - \hat{Y}_i)^2 \tag{4}$$

where, N is the total number of points, $Y_i$ is the observed values and $\hat{Y}_i$ is the predicted value.

The exemplary mmFlow system fine-tunes the network by exploring different hyperparameters of optimization, learning rate, batch size, and epoch. We find that CNN-LSTM performed much better with RMSprop optimizer, learning rate of $10^{-4}$, mini-batch size of 4, LReLU activations, and adaptive connection dropout of 25% each of the LSTM and two fully connected layers.

The following relates to prediction of the indicators at a fixed device distance. To evaluate mmFlow's effectiveness in predicting the indicators, we use the spirometry test samples at 11 cm device distance. Our experiments are conducted in a quiet office environment without any external airflow sources. Then, we collect the ground-truth indicators and find the absolute difference between the prediction and ground-truth.

Figure 5A:
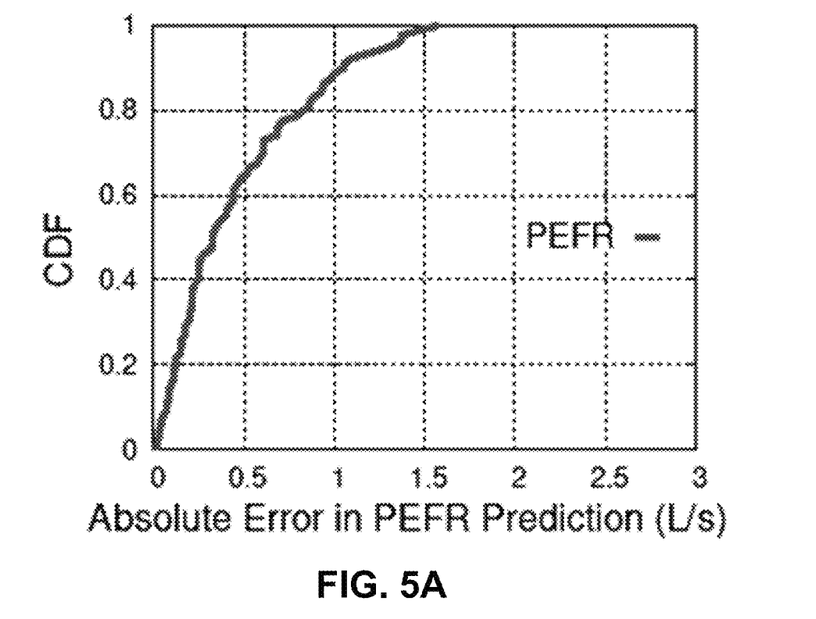
FIGS. 5A-5D respectively show graphs of Cumulative Distribution Function (CDF) of prediction errors in seven spirometry indicators, with FIG. 5A showing CDF of prediction error for Peak Expiratory Flow Rate (PEFR), with FIG. 5B showing CDF of prediction error for Forced Expiratory Volume (FEV1), with FIG. 5C showing CDF of prediction error for Forced Vital Capacity (FVC), and with FIG. 5D showing CDF for prediction error for each of Maximal MidExpiratory Flow (MMEF), and Forced Expiratory Flows (FEF75, FEF50, and FEF25).
Figure 5B:
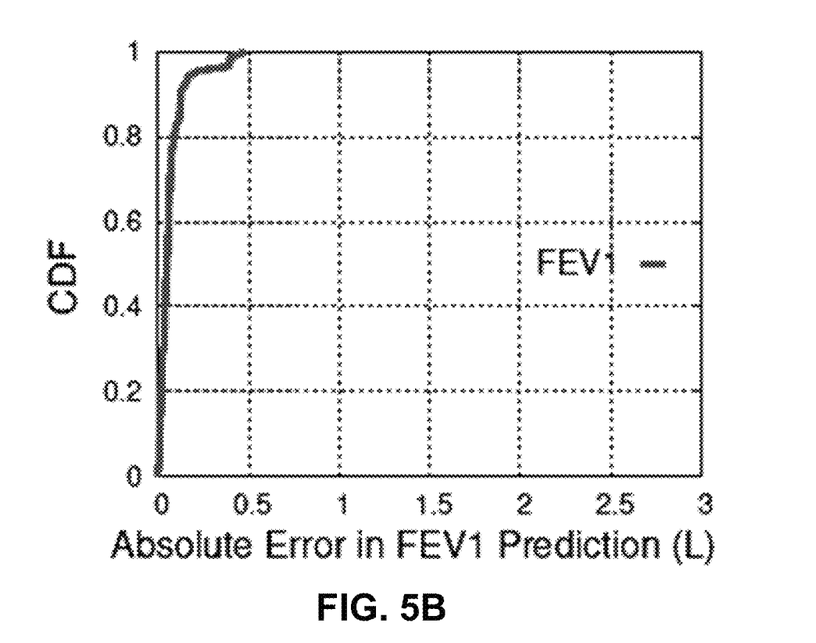
Figure 5C:
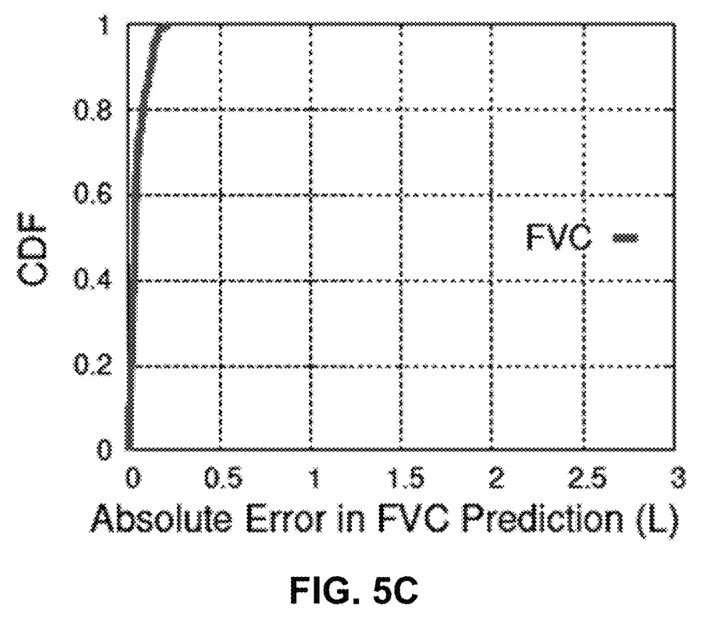
Figure 5D:
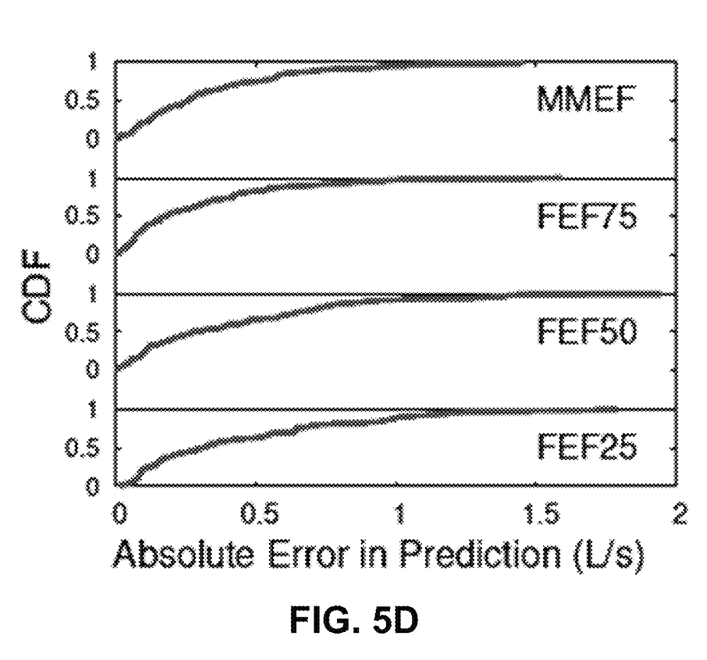

FIGS. 5A-5D respectively show graphs of CDF of prediction errors in seven spirometry indicators. FIGS. 5A-5C show the CDF of prediction errors for three key indicators, PEFR, FEV1, and FVC. The median and $90^{th}$ percentile PEFR prediction errors are 0.40 L/s and 1.28 L/s only. The median prediction error in mmFlow for FEV1 and FVC are very low, 0.05 L and 0.03 L only. We also observe similar performance gain in four other indicators in FIG. 5D, showing CDF for prediction error for each of MMEF, FEF75, FEF50, and FEF25. These results indicate that, when the device distance is fixed, mmFlow is highly accurate and its performance is comparable to in-clinic spirometers with <5% prediction errors[16].

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or step elements with insubstantial differences from the literal languages of the claims.

REFERENCES

[1] Darren Roblyer, "Perspective on the Increasing Role of Optical Wearables and Remote Patient Monitoring in the COVID-19 Era and Beyond," Journal of Biomedical Optics, vol. 25, no. 10, 2020.
[2] Gundersen Health System, "Diagnosis and Treatments for Respiratory and Lung Disorders," 2021. [Online]. Available: https://bit.ly/3umLTbk
[3] WebMD LLC., "A Third of COVID Survivors Have Long-Haul Symptoms," 2021. [Online]. Available: https://www.webmd.com/lung/news/20210219/a-third-of-covid-survivors-have-long-haul-symptoms
[4] EasyOne Air, "EasyOne Air," 2020. [Online]. Available: https://nddmed.com/products/spirometers/easyone-air
[5] Microlife, "Asthma Monitor," 2020. [Online]. Available: https://bit.ly/3sg2vjg
[6] MFI Medical, "Spirometry, Oximetry and Mobile-Health," 2020. [Online]. Available: https://www.spirometry.com/
[7] CDC, "Spirometry Procedures Manual," 2011. [Online]. Available: https://bit.ly/37rcc6t
[8] Ranu Harpreet, et al., "Pulmonary Function Tests," Ulster Medical Journal, vol. 80, no. 2, 2011.
[9] Jingwei Xu, et al., "Joint Range and Angle Estimation Using MIMO Radar With Frequency Diverse Array," IEEE Transactions On Signal Processing, vol. 63, no. 13, 2015.
[10] Texas Instruments, "IWR1443 Single-Chip 76-GHz to 81-GHz MmWave Sensor Evaluation Module," 2020. [Online]. Available: https://www.ti.com/tool/IWR1443BOOST
[11] Jones Medical, "Flow-Volume Calibrator (FVC-3000)," 2017. [Online]. Available: https://www.jonesmedical.com/product/flow-volume-calibrator-fvc-3000
[12] Amin Khorram, et al., "End-to-End CNN+LSTM Deep Learning Approach for Bearing Fault Diagnosis," Applied Intelligence, vol. 51, 2020.
[13] Yann LeCun, et al., Convolutional Neural Networks for Images, Speech and Time-Series, 4th ed. AT&T Bell Laboratories, 1995.
[14] Bing Xu, et al., "Empirical Evaluation of Rectified Activations in Convolutional Network," 2015. [Online]. Available: https://arxiv.org/abs/1505.00853
[15] Xiaobin Zhang, et al., "A Combination of RNN and CNN for Attention-based Relation Classification," Proc. Computer Science, vol. 131, 2018.
[16] Graham B L, et al., "Standardization of Spirometry 2019 Update. An Official American Thoracic Society and European Respiratory Society Technical Statement," Am J Respir Crit Care Med, vol. 200, 2019.
[17] Lorenzo Scalise, et al., "Wireless Sensing for the Respiratory Activity of Human Beings: Measurements and Wide-band Numerical Analysis," Journal of Antennas and Propagation, vol. 2013, no. 396459, 2013.
[18] Mayank Goel, et al., "SpiroCall: Measuring Lung Function over a Phone Call," in ACM CHI, 2016.
[19] Eric C Larson, et al., "SpiroSmart: Using a Microphone to Measure Lung Function on a Mobile Phone," in ACM UbiComp, 2012.
[20] Xingzhe Song, et al., "SpiroSonic: Monitoring Human Lung Function via Acoustic Sensing on Commodity Smartphones," in MobiCom, 2020.

What is claimed is:

1. An integrated methodology for performing at-home spirometry tests using smart devices having built-in millimeter-wave (mmWave) technology, comprising:
providing a smart device programmed with an mmFlow analysis application;
having a user hold such device in front of their mouth, inhale their full lung volume, and forcibly exhale until the entire volume is expelled to obtain a sample exhalation;
detecting vibrations of a surface of the device caused by the sample exhalation; and
processing the vibration data to determine at least one spirometry indicator for the user, using a combination of mmWave signal processing relative to the smart device and deep learning, wherein
detecting vibrations of the device surface includes detecting relatively small vibrations which directly affect the phase of reflected mmWave signals relative to the smartphone device from nearby objects; and
said integrated methodology further including receiving reflections from different objects adjacent said smart device, with incident airflow of a sample exhalation affecting the reflected signals.

2. An integrated methodology as in claim 1, wherein: said smart device comprises a smartphone.

3. An integrated methodology as in claim 2, further including forming distinct vibration signature images due to airflow, embodied as spectrogram (time-frequency) plots of vibration sample data.

4. An integrated methodology as in claim 3, wherein said deep learning includes the use of CNN-LSTM (Convolutional Neural Network-Long-Short Term Memory Network) architecture, and said processing includes analyzing said vibration signal images to map correlations between vibration amplitude signatures and spirometry indicators.

5. An integrated methodology as in claim 3, wherein forming distinct vibration signature images includes determining phase changes of reflected signals due to exhalation airflow-induced device surface vibrations defined by L/s peak flow rate to create distinct vibratory signatures of the reflected signals.

6. An integrated methodology as in claim 5, further including analyzing phase change by plotting a corresponding spectrogram which identifies vibration start and stop times, and the temporal distribution of the vibration amplitude and frequency.

7. An integrated methodology as in claim 6, further including analyzing the vibration signal, to identify the correlated airflow rate, exhalation volume, and predict the lung function accurately.

8. An integrated methodology as in claim 3, further including obtaining vibration signal data estimated as detected by a plurality of individual receive antennas of the smartphone device and a beamformed signal towards the strongest nearby reflector.

9. An integrated methodology as in claim 8, further including tracking phase change during movement of the associated smartphone device by repetitively updating the beamformed signal towards the strongest nearby reflector.

10. An integrated methodology as in claim 9, further including using a range-angle heatmap estimated by analysis of an associated environment of the smartphone device having two reflectors at known distances and angles from the smartphone device, including estimating phase change from a single strongest reflector throughout the spirometry test by using a reflector tracking scheme leveraging the range-angle estimation.

11. An integrated methodology as in claim 10, further including, prior to a user blowing a sample exhalation, obtaining and using measured reflected signals from multiple receive antennas to computationally scans the nearby region to find the strongest reflector.

12. An integrated methodology as in claim 11, further including steering the beamformed signal towards the strongest reflector by combining the signals from the multiple receive antennas using the following range-angle (r-θ) Equation (1):

$$BF(r, \theta) = \sum_{n=1}^{4} v_n(r) \times \exp\left[\frac{-j2\pi}{\lambda}(n-1)d\cos(\theta)\right] \quad (1)$$

where $V_n(r)$ is the reflected signal received at $n^{th}$ antenna from range r, $\lambda$ is the signal wavelength, and d is the inter-distance between the antennas (d=$\lambda$/2, in the mmFlow analysis application).

13. An integrated methodology as in claim 12, wherein the strongest reflector is determined by finding the r and θ from Equation (1) where |BF(r, 0)| is maximum per Equation (2):

$$\{r^*, \theta^*\} = \text{argmax}\{|BF(r,\theta)|\} \quad (2).$$

14. An integrated methodology as in claim 13, wherein vibration signals are estimated as detected by the multiple receive antennas and combined beamformed signal towards strongest reflector.

15. An integrated methodology as in claim 14, further including applying a high-pass filter the vibration signal estimates to remove any residual low-frequency movement of the user's hand.

16. A smart device having built-in mmWave technology, and programmed with an mmFlow analysis application, all operating in accordance with claim 1.

17. An integrated methodology for performing at-home spirometry tests using smart devices having built-in millimeter-wave (mmWave) technology, comprising:
providing a smart device programmed with an mmFlow analysis application;
having a user hold such device in front of their mouth, inhale their full lung volume, and forcibly exhale until the entire volume is expelled to obtain a sample exhalation;
detecting vibrations of a surface of the device caused by the sample exhalation; and
processing the vibration data to determine at least one spirometry indicator for the user, including using a combination of mmWave signal processing relative to the smart device and deep learning, wherein
said deep learning comprises a machine-learning model that uses vibration signals to predict spirometry results by using a deep convolution network that learns from a plurality of previous sample exhalations, the association between a vibration signal and airflow information;
obtaining a plurality of sample exhalations includes establishing a controlled environment for the smart device including a static support for the device adjacent a static reflector, and emulating sample exhalations from healthy individuals and different pulmonary disease patients so data spans a range of lung functions; and
said methodology further includes mapping correlations between vibration and spirometry indicators.

18. An integrated methodology as in claim 17, wherein said machine-learning model learns correlation between vibration signals and spirometry indicators using a nonlinear model.

19. An integrated methodology as in claim 18, wherein said nonlinear model includes using CNN-LSTM architecture designed for sequence prediction using spatial inputs.

20. An integrated methodology as in claim 19, wherein the CNN-LSTM architecture uses one-dimensional (1D) CNN as a feature extractor and LSTM with dense layers as a long-term regressor.

21. An integrated methodology as in claim 20, wherein the CNN-LSTM architecture uses vibration signals from a plurality of receive antennas and associated beamformed signal and predicts a plurality of spirometry indicators.

22. An integrated methodology as in claim 21, wherein the CNN feature extractor passes a 1D vibration signal from each receive antenna and beamformed signal through a corresponding plurality of 1D convolution layers.

23. An integrated methodology as in claim 22, wherein the convolution layers apply convolutional filters with a set of weights that slides over the input per successive smaller filter sizes, so that each convolution layer compresses the vibration signal towards its abstract local features.

24. An integrated methodology as in claim 23, wherein each of the CNN convolution layers employs a Leaky ReLU (LReLU) activation to help tune the network weights.

25. An integrated methodology as in claim 24, further wherein the output of the CNN layers is broken down into sequential components and is fed into recurring LSTM units for temporal analysis and prediction of indicators.

26. An integrated methodology as in claim 25, wherein the LSTM serves as the regressor, to capture long-term temporal dependencies between the abstract local features through recurrent connections between units.

27. An integrated methodology as in claim 26, wherein the LSTM further includes forget gates to selectively forget or remember input features, and uses backpropagating and adapting the weights through the gates, so that the LSTM module retains higher importance temporal features while discarding irrelevant ones.

28. An integrated methodology as in claim 27, further including two LSTM layers with unit sizes equal to four times the CNN's output size, with each LSTM layer employing Tanh activation while being fully connected with adjacent layers.

29. An integrated methodology as in claim 28, wherein the CNN-LSTM architecture outputs are processed through a regression layer with a linear activation to predict actual values of spirometry indicators.

30. An integrated methodology as in claim 29, wherein the CNN-LSTM architecture uses a Mean Squared Error (MSE) as a loss function to appropriately tune the convolution weights, which loss function calculates the average squared difference between the predicted and ground-truth indicators, and it accelerates the learning by penalizing weights causing larger errors, using Equation (4):

$$MSE = \frac{1}{N}\sum_{i=1}^{N}(Y_i - \tilde{Y}_i)^2 \quad (4)$$

where, N is the total number of points, $Y_i$ is the observed values and $\tilde{Y}_i$ is the predicted value.

31. An integrated methodology as in claim 30, wherein the CNN-LSTM architecture uses an RMSprop optimizer, learning rate of $10^{-4}$, mini-batch size of 4, LReLU activations, and adaptive connection drop-out of 25% for each of the LSTM and two fully connected layers.

32. An integrated methodology as in claim 17, wherein the smart device comprises a smart phone.

33. A smart device having built-in mmWave technology, and programmed with an mmFlow analysis application, all operating in accordance with claim 17.

34. A contactless method of lung function monitoring for a user, with such monitoring not affected by noise and motion, while providing all key spirometry indicators for the user, comprising:
  continuously transmitting a wireless signal towards a reflector and receiving its reflections using a 5G smart device having built-in mmWave technology, and having a supporting software-only spirometry application on such smart device;
  having a user produce a sample exhalation while holding the smart device in a relatively static position;
  using the spirometry application for detecting time-variant changes in the distance of the device to the reflector based on vibrations caused by airflow of the sample exhalation from the user;
  determining changes in phase based on detected changes in distance based on:

$$\Delta\varphi(t)=\{4\pi\Delta d(t)\}/\lambda,$$

where $\Delta d(t)$ is the temporal change in distance, and $\lambda$ is the signal wavelength;
  determining distinct vibration signature images due to airflow; and
  correlating such vibration signature images with spirometry indicators.

35. A contactless method of lung function monitoring for a user as in claim 34, wherein said correlating includes using CNN-LSTM architecture for analyzing said vibration signature images to map correlations between vibration amplitude signatures and spirometry indicators.

36. A contactless method of lung function monitoring for a user as in claim 34, wherein:
  the smart device includes a plurality of receive antennas that can measure reflections simultaneously; and
  said method further includes using beamforming and reflector tracking to continuously steer signals towards a same reflector to estimate the vibration characteristics accurately.

37. A contactless method of lung function monitoring for a user as in claim 34, wherein signals from all receive antennas are combined using the following range-angle (r-θ) Equation (1):

$$BF(r,\theta) = \sum_{n=1}^{4} v_n(r) \times \exp\left[\frac{-j2\pi}{\lambda}(n-1)d\cos(\theta)\right] \quad (1)$$

where $V_n(r)$ is the reflected signal received at $n^{th}$ antenna from range r, $\lambda$ is the signal wavelength, and d is the inter-distance between the antennas ($d=\lambda/2$, in the mmFlow analysis application).

38. A contactless method of lung function monitoring for a user as in claim 34, further including evaluating the spirometry indicators of the supporting software-only spirometry application on such smart device, by prediction of indicators at a fixed device distance, including:
  conducting spirometry test samples at a selected fixed distance, in a relatively quiet environment without any external airflow sources;
  collecting ground-truth indicators for the conducted spirometry test sample; and
  determining the absolute difference between such ground-truth indicators and the prediction determined indicators from the smart device.

39. A smart device having built-in mmWave technology, and having a supporting software-only spirometry application on such smart device, all operating in accordance with claim 34.

* * * * *